(12) United States Patent
Kneckt et al.

(10) Patent No.: US 9,736,763 B2
(45) Date of Patent: Aug. 15, 2017

(54) METHOD AND APPARATUS FOR AUTONOMOUS OFDMA BEACON RECEPTION MEASUREMENT

(75) Inventors: Jarkko Lauri Sakari Kneckt, Espoo (FI); Klaus Franz Doppler, Albany, CA (US)

(73) Assignee: Nokia Technologies Oy, Espoo (FI)

( * ) Notice: Subject to any disclaimer, the term of this patent is extended or adjusted under 35 U.S.C. 154(b) by 82 days.

(21) Appl. No.: 13/514,415

(22) PCT Filed: Dec. 30, 2009

(86) PCT No.: PCT/IB2009/007916
§ 371 (c)(1),
(2), (4) Date: Jun. 7, 2012

(87) PCT Pub. No.: WO2011/080533
PCT Pub. Date: Jul. 7, 2011

(65) Prior Publication Data
US 2012/0243433 A1    Sep. 27, 2012

(51) Int. Cl.
*H04W 24/00* (2009.01)
*H04W 48/16* (2009.01)
(Continued)

(52) U.S. Cl.
CPC ......... *H04W 48/16* (2013.01); *H04W 56/002* (2013.01); *H04W 8/005* (2013.01); *H04W 40/246* (2013.01)

(58) Field of Classification Search
CPC . H04W 24/00; H04W 56/00; H04W 56/0045; H04W 48/16; H04W 56/002;
(Continued)

(56) References Cited

U.S. PATENT DOCUMENTS 5,960,350 A * 9/1999 Schorman et al. ........... 455/450
2002/0181428 A1  12/2002 Kruys
(Continued)

FOREIGN PATENT DOCUMENTS

CN    101253715 A    8/2008
CN    101288267 A    10/2008
(Continued)

OTHER PUBLICATIONS

International Search Report and Written Opinion received for corresponding International Patent Application No. PCT/IB2009/007916, dated Sep. 13, 2010, 12 pages.
(Continued)

*Primary Examiner* — Mang Yeung
*Assistant Examiner* — Natali N Pascual Peguero
(74) *Attorney, Agent, or Firm* — Mintz Levin Cohn Ferris Glovsky and Popeo, P.C.

(57) ABSTRACT

In accordance with an example embodiment of the present invention, methods and apparatus, including computer program products, are provided. In one aspect there is provided a method. The method may include configuring the device to monitor the presence of the OFDMA beacons and the quality of the OFDMA beacon receptions. The device may transmit the beacon reports that detail the sensed beacons from the beaconing device during an OFDMA beacon opportunity. In another aspect there is provided a method. The method may include configuring a dedicated beacon quality measurement agreement between two or more devices. Based on the agreement defining the beacon transmission and reception periodicity, one device transmits a beacon and the other devices in the agreement monitor the beacon. Related apparatus, systems, methods, and articles are also described.

20 Claims, 3 Drawing Sheets

(51) Int. Cl.
*H04W 56/00* (2009.01)
*H04W 8/00* (2009.01)
*H04W 40/24* (2009.01)

(58) Field of Classification Search
CPC .... H04W 40/246; H04W 8/005; H04L 43/50;
H04L 43/0852; H04L 43/08; H04L 41/12;
H04L 45/02; H04L 45/00; H04L 45/04;
H04L 41/04; H04B 17/003; H04B
7/2628; H04B 2201/70701; H04B 7/2662
USPC ............... 370/252, 254, 335, 342, 350, 400
See application file for complete search history.

(56) References Cited

U.S. PATENT DOCUMENTS

| | | | |
|---|---|---|---|
| 2006/0268746 A1 | 11/2006 | Wijting et al. | |
| 2006/0268908 A1 | 11/2006 | Wang et al. | |
| 2007/0060067 A1* | 3/2007 | Ruuska | 455/67.11 |
| 2007/0213046 A1* | 9/2007 | Li et al. | 455/425 |
| 2009/0016249 A1 | 1/2009 | Li et al. | |
| 2009/0054054 A1* | 2/2009 | Shao et al. | 455/422.1 |
| 2009/0213816 A1* | 8/2009 | Guo et al. | 370/336 |
| 2009/0274134 A1* | 11/2009 | Wang | H04W 16/24 370/338 |
| 2009/0279514 A1* | 11/2009 | Seok | H04W 74/0816 370/336 |
| 2010/0031297 A1* | 2/2010 | Klein et al. | 725/78 |
| 2010/0046447 A1* | 2/2010 | Palanki et al. | 370/329 |
| 2010/0093364 A1 | 4/2010 | Ribeiro et al. | |
| 2010/0118842 A1* | 5/2010 | Kalhan | 370/338 |
| 2010/0169498 A1* | 7/2010 | Palanki | H04W 16/14 709/228 |
| 2010/0189046 A1* | 7/2010 | Baker | H04L 5/0007 370/329 |
| 2011/0149798 A1* | 6/2011 | Cordeiro | H04W 8/005 370/254 |

FOREIGN PATENT DOCUMENTS

| | | |
|---|---|---|
| WO | 02/089430 A1 | 11/2002 |
| WO | 2006/049724 A1 | 5/2006 |
| WO | WO 2006070997 A1 * | 7/2006 |
| WO | WO-2007029109 A2 | 3/2007 |
| WO | WO-2007063427 A2 | 6/2007 |
| WO | WO 2007082273 A1 * | 7/2007 |
| WO | 2007/135516 A2 | 11/2007 |
| WO | 2009/006166 A1 | 1/2009 |

OTHER PUBLICATIONS

Chawathe, "Low-Latency Indoor Localization Using Bluetooth Beacons", Proceedings of the 12th International IEEE Conference on Intelligent Transportation Systems, Oct. 3-7, 2009, pp. 467-473.
European Computer Manufacturers Association. "High rate ultra wideband PHY and MAC standard." ECMA-368, (2007).

* cited by examiner

1-HOP AND 2-HOP D2D NEIGHBORHOOD

BEACON REPORT ELEMENT 500

DEDICATED BEACON QUALITY MEASUREMENT REQUEST FRAME 600

BEACON RECEPTION MEASUREMENT RESPONSE 700

METHOD AND APPARATUS FOR AUTONOMOUS OFDMA BEACON RECEPTION MEASUREMENT

RELATED APPLICATION

This application was originally filed as PCT Application No. PCT/IB2009/007916 filed Dec. 30, 2009.

TECHNICAL FIELD

The present application relates generally to wireless communications.

BACKGROUND

Local area radio systems may be designed to complement existing wide area cellular systems, such as global system for mobile communications, GSM, universal mobile telecommunications system, UMTS, high-speed packet access, HSPA, or long term evolution, LTE. Unlike wide area cellular systems, local area radio systems can utilize the license-exempt spectrum or unused spectrum between TV channels, white spaces, to take advantage of the additional available bandwidth in these spectral resources. In addition, local area radio systems offer an efficient device discovery mechanism that provides availability information of devices in the proximity. The beaconing mechanism is generic and it may carry information for several purposes. For instance, the mechanism may be applied for inter access point, AP, signaling, to negotiate network configurations and to coordinate frequency and power utilization of the network.

One possibility is to use the beaconing mechanism to establish device-to-device, D2D, operation. D2D operation provides means to initiate data exchange between devices in the coverage area by establishing ad-hoc or mesh networks, or to enable direct transmissions between devices. D2D beaconing enables devices to discover each other and exchange information on their capabilities and offered services. D2D beaconing also provides a mechanism to initiate data exchange between the devices. The D2D beaconing is targeted to be available, even when the D2D beaconing devices are not associated with any network, to enable device discovery and the direct transmissions between devices.

SUMMARY

Various aspects of examples of the invention are set out in the claims,

In one aspect there is provided a method. The method is applied to monitor the presence and the quality of the orthogonal frequency-division multiple access, OFDMA, beacon receptions. An OFDMA beaconing devices may issue beacon maps to indicate statistics of beacon receptions of neighboring devices. The beacon maps may be unicasted to one or multiple devices or it may be transmitted as group addressed frame as general indication.

In another aspect there is provided a method. The method includes the possibility to setup a beacon quality measurement agreement between at least two devices to ensure OFDMA beacon transmission and reception. In the beacon quality measurement agreement, the devices agree on basic beacon transmission periodicity that they use for beacon transmission and reception. The devices that participate in dedicated beacon quality measurement report periodically the received beacons to each other.

The above-noted aspects and features may be implemented in systems, apparatus, methods, and/or articles depending on the desired configuration. The details of one or more variations of the subject matter described herein are set forth in the accompanying drawings and the description below. Features and effects of the subject matter described herein will be apparent from the description and drawings, and from the claims.

Figure 1:
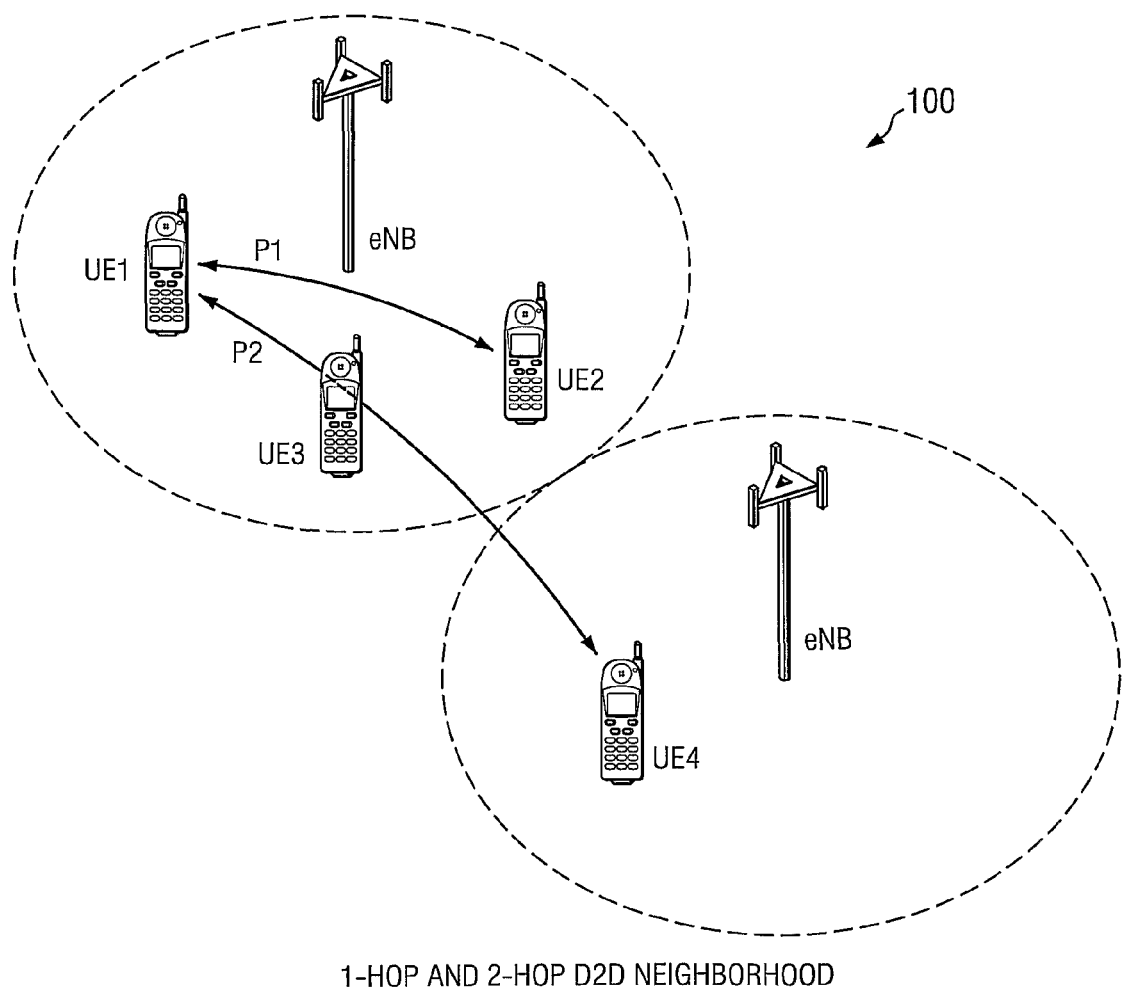
FIG. 1 depicts a definition of 1-hop and 2-hop D2D neighborhood in accordance with an example embodiment of the invention.

Like labels are used to refer to same or similar items in the drawings.

DETAILED DESCRIPTION

The subject matter described herein relates to OFDMA beaconing, but the embodiment can also be applied to beaconing based on other multiple-access methods, for example frequency-division multiple access, time division multiple access, code division multiple access or combinations thereof. The use of OFDMA beaconing is explained through the D2D operation example. D2D operation requires a beaconing mechanism to enable data exchange between the devices within the range feasible for D2D radio links. However, it should be noted that the OFDMA beaconing mechanism might be applied to provide also other type of information, like AP identity information or to announce the measurement results among devices in the coverage.

Beaconing is an operation needed for network maintenance and each network type may have its own beaconing mechanism. On top of network maintenance beaconing, a periodically repeating opportunity to transmit a radio frame, for example once every 100 ms, can be reserved for D2D beaconing, denoted as D2D Beacon Opportunity, BO. The beaconing resources may be defined in time, frequency and/or channel coding domains, so that a beacon need not consist of a transmission over the full system bandwidth. The D2D beacons may be concentrated in the frequency domain so that the resources reserved and order of the resource utilization for D2D beacons can be, depending on the demand, defined by a standard.

Concentrating all the D2D beacons in a single radio frame and into a single frequency band may yield one or more of the following energy effects. First, D2D devices need to wake up only once per beaconing period to hear the beacons of all D2D devices in the neighborhood. Second, depending on the D2D beacon resource utilization, the D2D devices may be able to quickly scan for other D2D devices in their D2D range. Third, the beaconing scheme may be flexible to carry different traffic types and the scheme may be suitable to broadcast information from many devices to many devices. Fourth, dedicated slots for D2D beacons may be easy to detect and other traffic transmission during these resources May be avoided. This results in a simple and efficient use of the transmission resources so a special coordination to protect D2D beacons may not be necessary. In practice, the concentration of D2D beacons to a single radio frame may not be feasible. However minimizing the amount of D2D beacon transmission reduces the resources needed for their handling.

FIG. 1 depicts a definition of 1-hop and 2-hop D2D neighborhood in accordance with an example embodiment of the invention. Two communication paths between the D2D users are illustrated. One is 1-hop direct link between UE1 and UE2. The other one is 2-hop communication between UE1 and UE4 with the help of a nearby UE3.

FIG. 1 may be seen to define the radio coverage. UE1 and UE3 are within reach of each other so that the devices may transmit frames directly to each other. This connectivity may be named to be 1-hop coverage or 1-hop neighborhood. The UE1 and UE4 are not in the radio coverage, but they are within 1-hop coverage of the UE3. If the UE1 and UE4 transmit at the same time on the same resource, these transmissions will not be understandable by UE3, because the colliding signals corrupt each other. Thus, it may be stated that UE1 and UE4 are within 2-hop coverage or 2-hop neighborhood, they may not be able to receive or sense each other's transmissions, but if the devices transmit at the same resource, the reception is likely corrupted for the devices that are within 1-hop coverage of UE1 and UE4.

Figure 2:
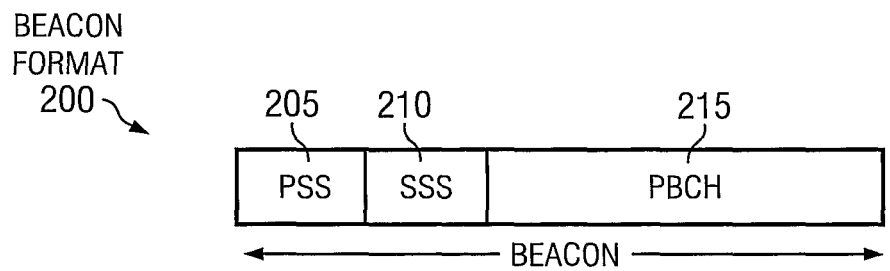
FIG. 2 depicts an OFDMA beacon format in accordance with an example embodiment of the invention.

FIG. 2 depicts an OFDMA beacon format in accordance with an example embodiment of the invention. The beacon signal comprises similar synchronization sequences and information elements as currently used by third generation partnership project long term evolution, 3GPP LTE, networks to find and access cells. It comprises a primary synchronization sequence, PSS, 205 and a secondary synchronization sequence, SSS, 210 together with a primary broadcast channel, PBCH, 215. Similar to LTE, in this example the primary and secondary synchronization sequences form part of the layer 1 device ID, which is used to separate reference symbols and the content of the PBCH among neighboring devices. Cell separation may include use of low correlation scrambling codes, frequency shifted reference symbol patterns or other orthogonalization schemes.

In a D2D case where many devices may transmit simultaneously, the processing task for the scanning and sequence detection may be largely reduced. This can be achieved by assigning a small part, for example 10, of the possible secondary synchronization sequences for D2D beacons and a new primary synchronization sequence for D2D beaconing. In this example, if there are 25 beacon channels and by having 10 secondary synchronization sequences, 250 devices can transmit their D2D beacon at the same time in each BO. The PBCH code block may carry information related to the beacon. The information may comprise information relating to beacon transmission periodicity. The information may also comprise an indication that the next BO is to be skipped. It should be noted that beacon transmitters might have different periodicity for beacon transmission. The total number of devices applying a beaconing scheme within a 2-hop neighborhood may be higher than within a one-hop neighborhood.

During a BO a device may transmit its own D2D beacon, receive D2D beacons of other devices, or operate in save power state and not participate to the BO. Devices may not be capable of receiving and transmitting simultaneously in the same frequency. Thus, in an embodiment, each device selects its operation, for example transmit, receive or save power for each BO. In this embodiment, the only limitation is that devices that participate in D2D beaconing shall transmit a D2D beacon at least one time between every maximum beaconing interval. If the value of maximum beaconing interval is 16 BOs, for example, then one D2D beacon frame shall be transmitted at least every 16 BOs. The maximum beaconing interval ensures the discoverability of the beaconing device. If the available slots are not sufficient, the D2D devices operating on the same beacon channel and using the same synchronization sequence may coordinate their beacon transmissions in the time domain, for example by transmitting a beacon only every fourth BO. The number of devices that can send their beacon simultaneously increases by a factor of four in this example.

The transmitter of the beacons may not be able to ascertain whether the beacons it transmits are successfully received, because beacon frames do not have an acknowledgement procedure. The beacon transmission may fail, if two or more transmitters are trying to transmit their beacon at the same frequency and time or if the signal quality of the transmission is not adequate. In OFDMA type of beaconing scheme where devices are transmitting their beacons simultaneously during the repeating time intervals, even an always-ongoing measurement may not provide the reception capability to ensure that beacons are transmitted collision free.

Device that transmits OFDMA beacons maintains statistics of all received OFDMA beacons during the beaconing periods that it has listened to the transmitted beacons of neighboring devices. A device may monitor the D2D beacon transmissions at least for four BOs, for example, before it may transmit its own D2D beacon. During the monitoring time, the device may discover reserved slots for D2D beacon transmissions and receive autonomous beacon map indicating D2D beacon transmissions and determine a free slot for its own D2D beacon transmission. Here a slot is defined by a beacon channel (frequency), a synchronization sequence and a periodicity for the beacon transmission. Devices cannot receive OFDMA beacons at the very same time when they transmit their own OFDMA beacon. Thus, no device that transmits its own OFDMA beacons is able to receive during all OFDMA beacon transmission times.

If two or more devices within 2-hop coverage are transmitting at the same beacon slot their signal-to-interference ratio may not be at a tolerable level, which may result in failure of transmissions due to collision. The device may be configured to not change the slot that it uses for beacon transmission unless the device detects that another device is colliding with its beacon. If a collision is detected, the device does the slot re-selection for its D2D beacon transmission. The beaconing devices have predefined space of orthogonal beacon slots and within the slots, some orthogonal synchronization sequences. The received beacon delivery reports may provide additional guidance of the available and reserved sequences, periodicities of the beacon transmissions and the frequencies that are in use for beacon transmissions.

The device may use a maximum transmission power for its D2D beacon frames. The maximum transmission power ensures maximum coverage for the transmitted beacon frames. Every transmitted D2D beacon frame may have a constant interval of BOs between consecutive D2D beacons transmissions. A device may insert an indication in the D2D beacon to inform other devices, if it will skip the D2D beacon transmission at the next BO. The indication may comprise a dedicated bit. Skipping its own beacon transmission enables the device to listen to other beacon transmissions during its own D2D beacon transmission time. The devices may transmit at least one extra beacon in addition to normal D2D beacon transmission periodicity. The transmission of extra beacons may enable other devices with the same D2D beacon transmission periodicity to receive beacons from each other.

To determine the delivery status, a measurement can be applied so that devices can shares the information of the received beacon frames. A device that transmits D2D beacons may monitor and report the D2D beacons that it has received. Information about the received beacons may be transmitted in a beacon map that contains the received D2D beacons or identifiers thereof. The beacon map may be transmitted during a D2D BO as an information element of the D2D beacon frame or as separate group addressed frame, or it may be exchanged in a request and response scheme as a unicast frame during a handshake procedure. Devices may request beacon maps to detect collision free beacon transmission for their own use and if they want to discover all devices that transmit OFDMA beacons within a two hop neighborhood.

By receiving multiple beacon map elements and by combining information provided in the reports, a device may obtain the reserved beacon locations and preambles within a 2-hop neighborhood. A device may thus also obtain knowledge on reception of its own beacons by other devices. The beacon map elements may contain fields to indicate whether the transmitter of the beacon map element has received a D2D beacon. If the transmitter itself does not receive the D2D beacon, the beacon map element may provide information indicating that neighboring devices have received a D2D beacon from the transmitter. This information may be obtained from a beacon map element of the neighboring devices. If OFDMA beacons carry different information types, the different types of OFDMA beacons are likely transmitted at separate times or at separate frequencies. Typically, one beacon map is applied for one type of the OFDMA beacons.

By combining multiple measurement reports, a device may also detect collisions of OFDMA beacons within a range of two hops. If one or more beacon map elements indicate that the synchronization sequences are received but the primary broadcast channel cannot be decoded, or that no beacon is received, it is likely that two beacon transmissions collide. The devices operating in active mode may try to transmit or receive D2D beacons at every BO. Thus, they enable efficient services marketing and precise information rich beacon maps. However, it may happen that devices may have to skip at least some BOs to be able to scan for neighboring devices.

Figure 3:
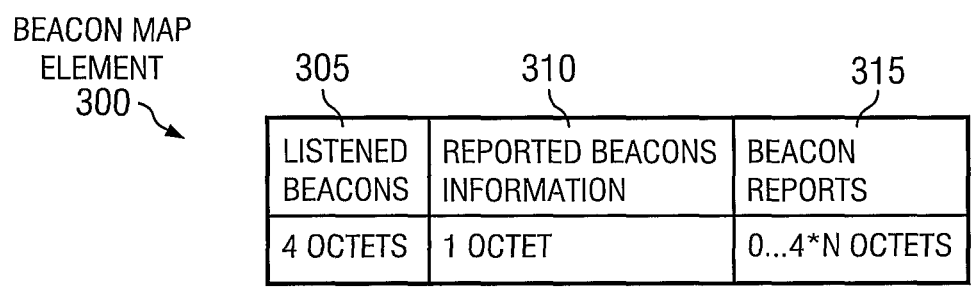
FIG. 3 depicts format of beacon map element in accordance with an example embodiment of the invention.

FIG. 3 depicts format of beacon map element in accordance with an example embodiment of the invention. Beacon map element 300, which may be transmitted during D2D BO or as a response to beacon map request frame. The beacon map element 300 includes listened beacons 305, reported beacons info 310 and beacon report element 315. In the example illustrated, the listened beacons 305 is four octets in length and represents a bit field indicating the listening times during the last 32 BOs. Bit 0 indicates the status for the last BO, bit 1 indicates the status of second last BO and recursively the bit 31 indicates the status of previous −31 BOs. Keeping track of the last 32 BO allows the device receiving the beacon map to detect a collision, i.e. detecting BOs where the device transmitted a beacon but the beacon has not being received matching with the applied slot and synchronization sequence. Each bit may be set to 1 to indicate that the reporting device has monitored the D2D beacons during the BO and set to 0 otherwise.

Figure 4:
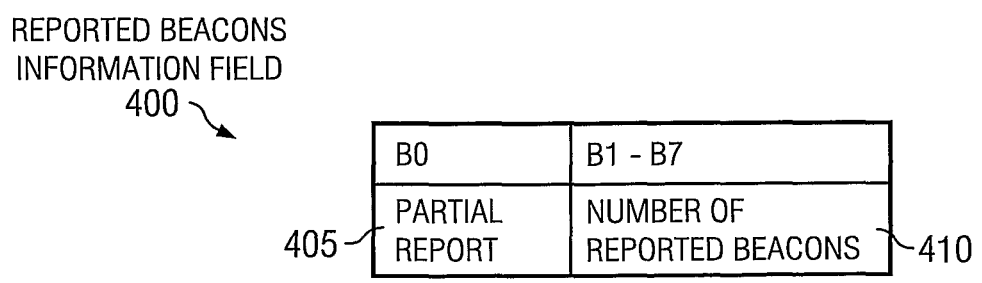
FIG. 4 depicts format of reported beacons info field in accordance with an example embodiment of the invention.

FIG. 4 depicts format of reported beacons info field in accordance with an example embodiment of the invention. In the example illustrated, the reported beacons info field 310 of FIG. 3 present in the beacon map element is one octet in length and contains fields as shown in FIG. 4. The partial report field 405 is one bit in length and set to 1 indicate that the beacon report does not contain reports for all received beacons within the last 32 of the listened BOs. The bit is set to 0 to indicate that the beacon report contains information for all known or received beacons within the last 32 BOs. The number of reported beacons field 410 indicates total amount of reported D2D beacons in the report.

Figure 5:
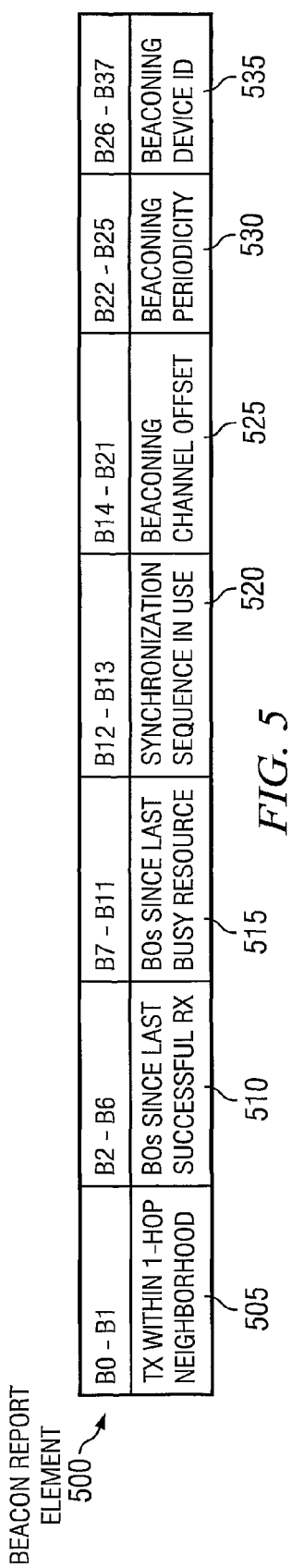
FIG. 5 depicts format of the beacon report element in accordance with an example embodiment of the invention.

FIG. 5 depicts format of the beacon report element 315 of FIG. 3 present in the beacon map element in accordance with an example embodiment of the invention. In the example illustrated, a transmission, Tx, within 1-hop neighborhood field 505 is two bits in length and set to "11" to indicate that the reporting device has received the D2D beacon, set to "10" to indicate that device has received the synchronization sequences for the D2D beacon, but has not received the payload correctly and set to "01" to indicate that devices has sensed energy in resource over some predefined limit, for instance −82 dBm, but not received synchronization sequence nor beacon frame correctly and the field is set to "00" to indicate that the device has sensed that power in resource is less than the predefined value and the device has not received a beacon from the beaconing device. If this bit is set to "00", "01" or "10", the beacons report element is copied from a received beacon map that indicates the reception of the D2D beacon within 1-hop neighborhood. The information of the received beacons by the device and 1-hop neighborhood provides awareness of the beacon opportunity utilization within 2-hop coverage.

In the example illustrated, a BOs since last successful reception, Rx, 510 indicates the number of BOs since the last successful reception of the D2D beacon from the transmitter of the D2D beacon or if the Tx within 1-hop field 505 is set to "00", "01" or "10" the field indicates number of BOs since the reporting device received the beacon successfully. Value 0 indicates that previous BO contains successful transmission of the D2D beacon. If the Tx within 1-hop neighborhood field is set to zero, the field indicates the BO of the last successful reception as indicated in the received beacon map elements from some other devices.

In the example illustrated, a BOs since last busy resource 515 indicates the number of BOs since the device has sensed energy over the predefined level or received preamble from the media, but the device has not received the beacon payload correctly. Value 0 indicates that previous BO contains energy or correct preamble reception and failed beacon reception. In the example illustrated, a synchronization sequence in use field 520 is two bits in length and specifies the synchronization sequence of the transmitted D2D beacon. This information element provides means to use code division multiple access, CDMA, with D2D beacons.

In the example illustrated, a beaconing channel offset field 525 is one octet in length and specifies a signed integer of the offset between beaconing channels used by the reporting and reported devices. The beaconing channel of the reported device equals the beaconing channel of the reporting device+beacon channel offset. In the example illustrated, a beaconing periodicity field 530 is four bits in length and indicates the D2D beacon transmission periodicity of the reported device. The beaconing device id 535 is twelve bits in length and indicates the last twelve bits of the address or identifier that is used by the reported device.

In some embodiments of the invention, a dedicated beacon quality measurement is an agreement where at least two devices agree on the basic beacon reception and transmission periodicity. The two devices share the same BO, wherein one device transmits and the other device receives within the BO. Thus, each beacon transmission from the device with established dedicated quality measurement is monitored at least by the other device that has agreed to use the dedicated beacon quality measurement. The coordination of the resource utilization provides accurate statistics of the D2D beacon transmission quality and increases the reliability of the D2D beacon transmissions.

Devices operating in a dedicated beacon quality measurement scheme may perform extra beacon reception and transmissions in addition to the negotiated basic periodicity. In some embodiments, an ongoing dedicated beacon quality measurement is not signaled to third party devices, in other words it is an agreement between the at least two devices. In principle, one transmitter in a dedicated beacon quality measurement scheme may have multiple devices that are receiving during the beacon transmission. However, multiple receivers may lower the flexibility of the dedicated beacon quality measurement because the change of the basic beaconing periodicity becomes more difficult.

For example, devices A and B agree on joint interval of the BOs. In every even interval device A transmits a beacon and device B receives the beacons. In every odd interval device B transmits a beacon and device A receives the beacons. Device A sends a periodical report at an agreed interval to device B indicating the status of device B beacon transmissions. One possibility of the interval is to transmit the report at the same BO that is applied for beacon transmission. From the report device B may check that no colliding beacons are transmitted at the same slot. Similarly, device B indicates the status of device A beacon transmissions.

Even though this example embodiment of the invention lists that beacon quality measurement is performed for OFDMA beacons, the same measurement could be set for beaconing schemes that apply OFDM transmissions. For instance, the beacon measurement could be set up between WLAN devices to monitor these devices beacon transmission quality.

If a device in dedicated beacon quality measurement has not received beacons from the other device within a predetermined number of BOs, which is signaled during measurement setup, the device may assume that the other device no longer exists and terminate the dedicated beacon quality measurement. Devices may redo the dedicated beacon quality measurement setup, if they are forced to change resource for beacon transmission.

A device may transmit the dedicated beacon quality measurement request to unicast address. A device may request the use of dedicated beacon quality measurement. The receiver of the dedicated beacon quality measurement request frame may respond with a dedicated beacon quality response and provide the status of the measurement setup. After successful setup of the dedicated beacon quality measurement, the requested and requesting device may have aligned their beaconing periodicity. After the setup, both devices shall have knowledge of each other's beacon map generation interval. In some embodiments the same generation interval for beacon maps is applied in both devices. In some embodiments both devices apply different periodicity.

Figure 6:
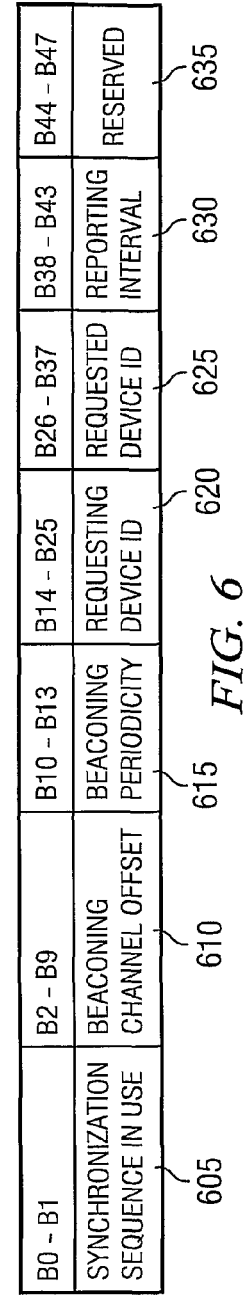
FIG. 6 depicts the formats of dedicated beacon quality request in accordance with an example embodiment of the invention.

FIG. 6 depicts the formats of dedicated beacon quality request in accordance with an example embodiment of the invention. In the example illustrated, a synchronization sequence in use field 605 is two bits in length and specifies a synchronization sequence that the requesting device applies. This information element provides means to have CDMA in use with D2D beacons. In the example illustrated, a beaconing channel offset field 610 is one octet in length and specifies a signed integer of the offset between beaconing channels used by the requested device and the requesting device. The beaconing channel of the requesting device equals to beaconing channel of requested device plus the value of the beacon channel offset.

In the example illustrated, a beaconing periodicity field 615 is four bits in length and indicates the D2D beacon transmission periodicity of the requesting device. In the example illustrated, a requesting beaconing device id 620 is twelve bits in length and indicates the last twelve bits of the address or identifier that is used by the requesting device. A requested beaconing device id 625 may be twelve bits in length and may indicates the last twelve bits of an address or identifier that is used by the requested device. In the example illustrated, a reporting interval 630 is six bits in length and provides the periodicity of the beacon map transmission. The transmitted beacon maps may comprise at least the status of D2D beacon receptions. A reserved field 635 may be four bits in length and may be used by the requesting device to indicate other information for dedicated beacon quality request.

Figure 7:
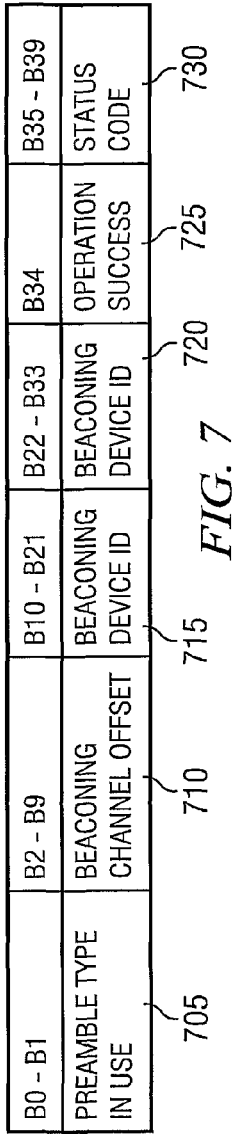
FIG. 7 depicts the formats of dedicated beacon quality response in accordance with an example embodiment of the invention.

FIG. 7 depicts the formats of dedicated beacon quality response in accordance with an example embodiment of the invention. FIG. 7 depicts an example of the dedicated beacon quality response frame 700. In the example illustrated, a synchronization sequence in use field 705 is two bits in length and specifies the synchronization sequence that the requesting device applies. This information element enables using CDMA with D2D beacons. The beaconing channel offset field 710 is one octet in length and specifies a signed integer of the offset between beaconing channels used by the requesting device and the requested device. The beaconing channel of the requested device equals to beaconing channel of requesting device plus the value of the beacon channel offset.

In the example illustrated, a requesting beaconing device id 715 is twelve bits in length and indicates the last twelve bits of the address or identifier that is used by the requesting device. The requested beaconing device id 720 is twelve bits in length and indicates the last twelve bits of the address or identifier that is used by the requested device. An operation success field 725 may be one bit in length and set to 1 to indicate that dedicated beacon quality measurement has been successfully created, and otherwise set to 0. A status code 730 may comprise a reason indicator for operation. Example values of the status code 730 are shown below.

| Value | Description |
| --- | --- |
| 0 | Success |
| 1 | Failure due to established monitoring intervals |
| 2 | Failure, the proposed D2D beacon transmission periodicity is not possible |
| 3 | Failure, the proposed reporting periodicity is not possible |
| 4 | unspecified failure |
| Other values | Reserved |

The subject matter described herein may be embodied in systems, apparatus, methods, and/or articles depending on the desired configuration. For example, the base stations and user equipments (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, apparatus and/or device (e.g., magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method comprising:
    monitoring, by a user equipment, for a presence of a plurality of orthogonal frequency division multiple access device-to-device beacons over a course of a plurality of beacon transmission opportunities, the plurality of orthogonal frequency division multiple access device-to-device beacons transmitted by at least one other user equipment;
    monitoring, by the user equipment, at least one quality parameter relating to reception of each of the plurality of orthogonal frequency division multiple access device-to-device beacons; and
    transmitting, by the user equipment and to the at least one other user equipment, a beacon map comprising information indicating whether each of the plurality of orthogonal frequency division multiple access device-to-device beacons were received properly, in each of the plurality of beacon transmission opportunities, based at least in part upon the at least one quality parameter.

2. The method of claim 1, wherein the transmitting further comprises:
    transmitting the beacon map as a broadcast radio frame designated for beaconing, wherein the beacon map comprises an indication of listening times over a predefined set of beaconing opportunities and reported beacons information over the predefined set of beaconing opportunities.

3. The method of claim 2, wherein the transmitting further comprises:
    transmitting the beacon map triggered by a detection of at least one of a reduced number of beacon receptions, a free slot, a new transmitter, and a poor beacon transmission quality.

4. The method of claim 1, wherein the transmitting further comprises:
    transmitting the beacon map to the at least one other user equipment as a unicast frame, in response to a beacon map request from the at least one other user equipment.

5. The method of claim 1, wherein the beacon map further comprises at least one of an indication of whether the beacon map contains information for all known or received beacons within a predetermined number of preceding beacon opportunities, or an indication of a number of beacon reports contained in the beacon map.

6. A method comprising:
    transmitting, by a first user equipment and to a second user equipment, a request to set up a dedicated beacon transmission and reception periodicity between the first user equipment and the second user equipment;
    transmitting, by the first user equipment and during a first set of beacon transmission opportunities, one or more first orthogonal frequency division multiple access device-to-device beacons to at least the second user equipment, the first set of beacon transmission opportunities determined based on at least the transmission and reception periodicity;
    monitoring, by the first user equipment and during a second set of beacon transmission opportunities, for a plurality of second orthogonal frequency division multiple access device-to-device beacons from the second user equipment, the second set of beacon transmission opportunities determined based on at least the transmission and reception periodicity, wherein the second set of beacon transmission opportunities does not overlap with the first set of beacon transmission opportunities;
    monitoring, by the first user equipment, at least one quality parameter relating to reception of the plurality of second orthogonal frequency division multiple access device-to-device beacons, the plurality of second orthogonal frequency division multiple access device-to-device beacons transmitted to enable monitoring by the second user equipment; and
    transmitting, by the first user equipment and to the second user equipment, a beacon map comprising information indicating whether each of the plurality of second orthogonal frequency division multiple access device-to-device beacons were received properly, in each of the second set of beacon transmission opportunities, based at least in part upon the at least one quality parameter.

7. The method of claim 6, wherein the request to set up the dedicated beacon transmission and reception periodicity comprises at least one of a synchronization sequence in use, a beaconing channel offset, a beacon transmission periodicity, a requesting device identifier, a requested device identifier, and a periodicity of the beacon map transmission.

8. An apparatus comprising:
at least one processor circuit; and
at least one memory including computer program code, the at least one processor circuit, the at least one memory, and the computer program code configured to cause the apparatus to at least:
  monitor for a presence of a plurality of orthogonal frequency division multiple access device-to-device beacons over a course of a plurality of beacon transmission opportunities, the plurality of orthogonal frequency division multiple access device-to-device beacons transmitted by at least one other user equipment;
  monitor at least one quality parameter relating to reception of each of the plurality of orthogonal frequency division multiple access device-to-device beacons, wherein the apparatus comprises a user equipment; and
  transmit, to the at least one other user equipment, a beacon map comprising information indicating whether each of the plurality of orthogonal frequency division multiple access device-to-device beacons were received properly, in each of the plurality of beacon transmission opportunities, based at least in part upon the at least one quality parameter.

9. The apparatus of claim 8, wherein the apparatus is further configured to at least transmit the beacon map autonomously as a broadcast frame.

10. The apparatus of claim 9, wherein the apparatus is configured to at least transmit the beacon map triggered by at least one of a reduced number of beacon receptions, a free slot, a new transmitter, and a poor beacon transmission quality.

11. The apparatus of claim 8, wherein the apparatus is further configured to at least:
  transmit the beacon map to the at least one other user equipment as a unicast frame, in response to a beacon map request from the at least one other user equipment.

12. The apparatus of claim 8, wherein the beacon map further comprises at least one of an indication of whether the beacon map contains information for all known or received beacons within a predetermined number of preceding beacon opportunities, or an indication of a number of beacon reports contained in the beacon map.

13. An apparatus comprising:
at least one processor circuit; and
at least one memory including computer program code, the at least one processor circuit, the at least one memory, and the computer program code configured to cause the apparatus to at least:
  transmit, to a user equipment, a request to set up a dedicated beacon transmission and reception periodicity between the apparatus and the user equipment;
  transmit, during a first set of beacon transmission opportunities, one or more first orthogonal frequency division multiple access device-to-device beacons to at least the user equipment, the first set of beacon transmission opportunities determined based on at least the transmission and reception periodicity;
  monitor, during a second set of beacon transmission opportunities, for a plurality of second orthogonal frequency division multiple access device-to-device beacons from the user equipment, the second set of beacon transmission opportunities determined based on at least the transmission and reception periodicity, wherein the second set of beacon transmission opportunities does not overlap with the first set of beacon transmission opportunities;
  monitor at least one quality parameter relating to reception of the plurality of second orthogonal frequency division multiple access device-to-device beacons, the plurality of second orthogonal frequency division multiple access device-to-device beacons transmitted to enable monitoring by the user equipment; and
  transmit, to the user equipment, a beacon map comprising information indicating whether each of the plurality of second orthogonal frequency division multiple access device-to-device beacons were received properly, in each of the second set of beacon transmission opportunities, based at least in part upon the at least one quality parameter.

14. The apparatus of claim 13, wherein the request to set up the dedicated beacon transmission and reception periodicity comprises at least one of a synchronization sequence in use, a beaconing channel offset, a beacon transmission periodicity, a requesting device identifier, a requested device identifier, and a periodicity of the beacon map transmission.

15. A non-transitory computer-readable storage medium including computer program code which when executed on at least one processor circuit provides at least the following:
  monitoring, by a user equipment, for a presence of a plurality of orthogonal frequency division multiple access device-to-device beacons over a course of a plurality of beacon transmission opportunities, the plurality of orthogonal frequency division multiple access device-to-device beacons transmitted by at least one other user equipment;
  monitoring, by the user equipment, at least one quality parameter relating to reception of each of the plurality of orthogonal frequency division multiple access device-to-device beacons; and
  transmitting, by the user equipment and to the at least one other user equipment, a beacon map comprising information indicating whether each of the plurality of orthogonal frequency division multiple access device-to-device beacons were received properly, in each of the plurality of beacon transmission opportunities, based at least in part upon the at least one quality parameter.

16. The non-transitory computer-readable storage medium of claim 15, wherein the transmitting further comprises:
  transmitting the beacon map autonomously as a broadcast frame.

17. The non-transitory computer-readable storage medium of claim 16, wherein the transmitting further comprises:
  transmitting the beacon map triggered by a detection of at least one of a reduced number of beacon receptions, a free slot, a new transmitter, and a poor beacon transmission quality.

18. The non-transitory computer-readable storage medium of claim 15, wherein the transmitting further comprises:
  transmitting the beacon map as a unicast frame to the at least one other user equipment, in response to a beacon map request from the at least one other user equipment.

19. A non-transitory computer-readable storage medium including computer program code which when executed on at least one processor circuit provides at least the following:
  transmitting, by a first user equipment and to a second user equipment, a request to set up a dedicated beacon transmission and reception periodicity between the first user equipment and the second user equipment;

transmitting, by the first user equipment and during a first set of beacon transmission opportunities, one or more first orthogonal frequency division multiple access device-to-device beacons to at least the second user equipment, the first set of beacon transmission opportunities determined based on at least the transmission and reception periodicity;

monitoring, by the first user equipment and during a second set of beacon transmission opportunities, for a plurality of second orthogonal frequency division multiple access device-to-device beacons from the second user equipment, the second set of beacon transmission opportunities determined based on at least the transmission and reception periodicity, wherein the second set of beacon transmission opportunities does not overlap with the first set of beacon transmission opportunities;

monitoring, by the first user equipment, at least one quality parameter relating to reception of the plurality of second orthogonal frequency division multiple access device-to-device beacons, the plurality of second orthogonal frequency division multiple access device-to-device beacons transmitted to enable monitoring by the second user equipment; and transmitting, by the first user equipment and to the second user equipment, a beacon map comprising information indicating whether each of the plurality of second orthogonal frequency division multiple access device-to-device beacons were received properly, in each of the second set of beacon transmission opportunities, based at least in part upon the at least one quality parameter.

20. The non-transitory computer-readable storage medium of claim 19, wherein the request to set up the dedicated beacon transmission and reception periodicity comprises at least one of a synchronization sequence in use, a beaconing channel offset, a beacon transmission periodicity, a requesting device identifier, a requested device identifier, and a periodicity of the beacon map transmission.

* * * * *